UNITED STATES PATENT OFFICE.

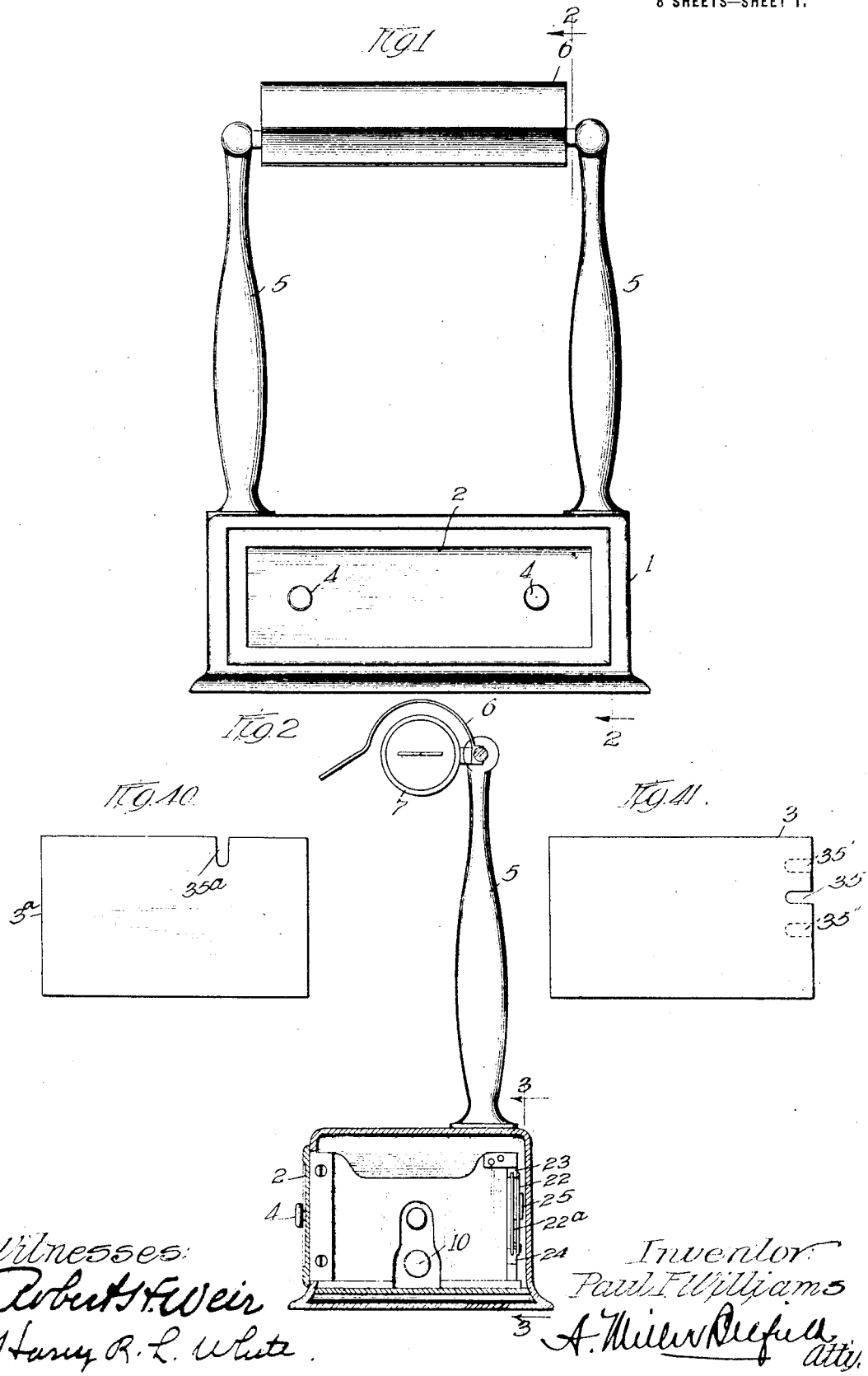

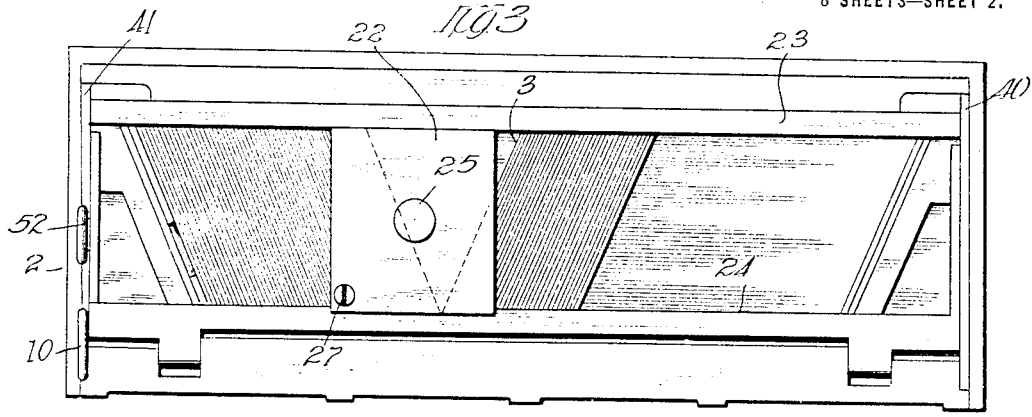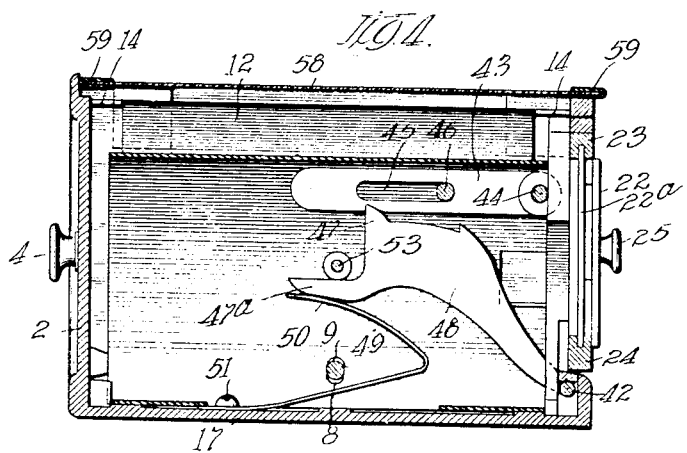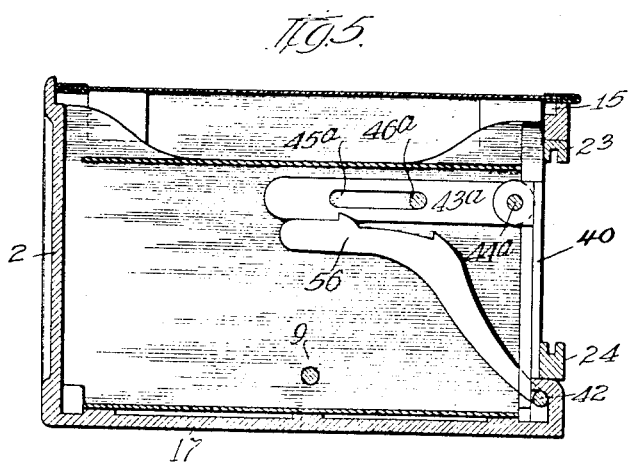

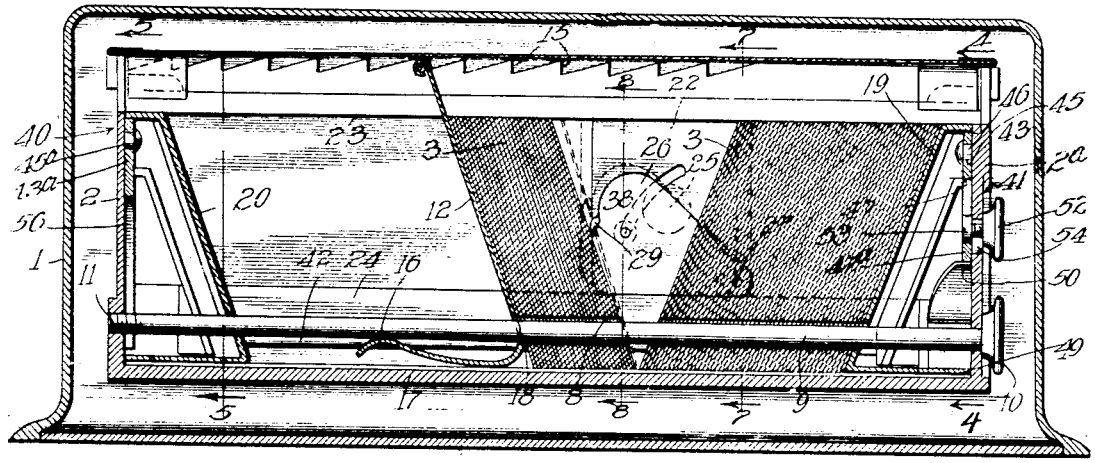
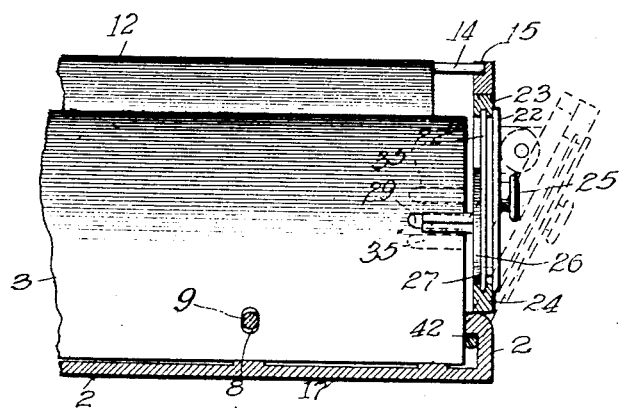
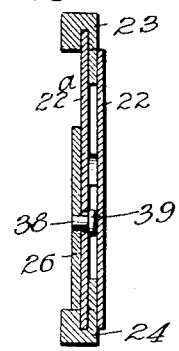
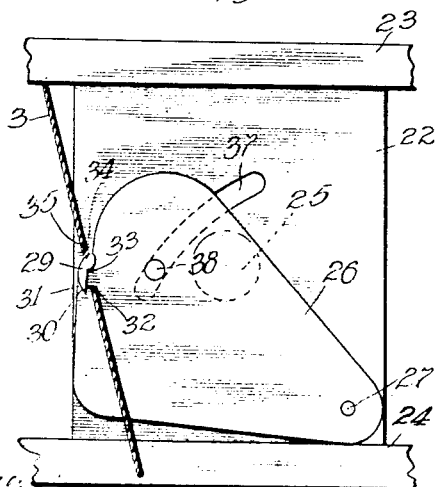
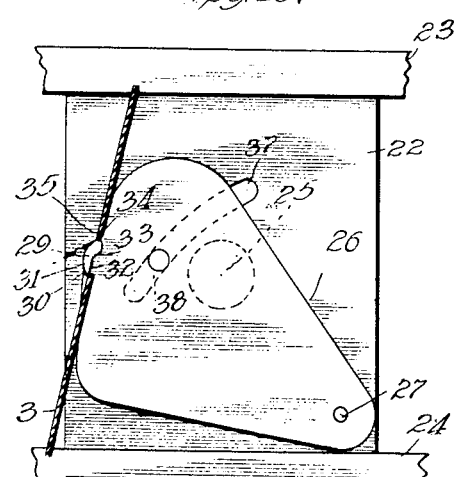

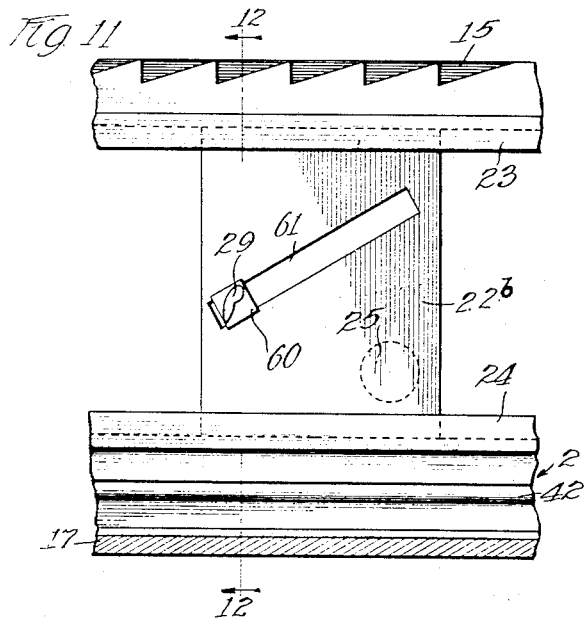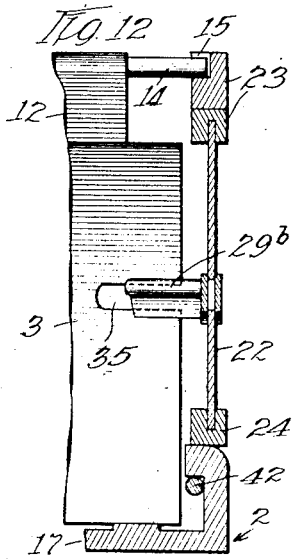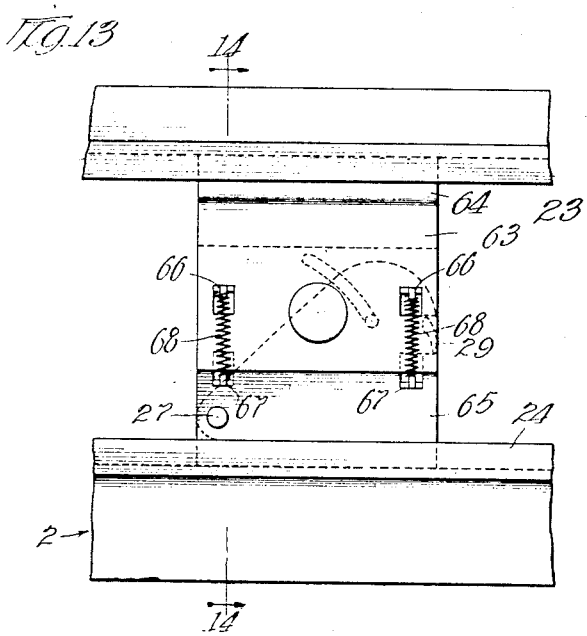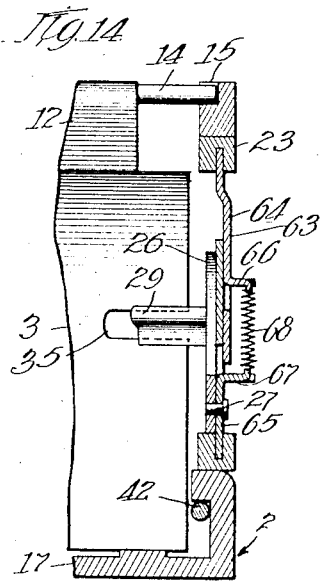

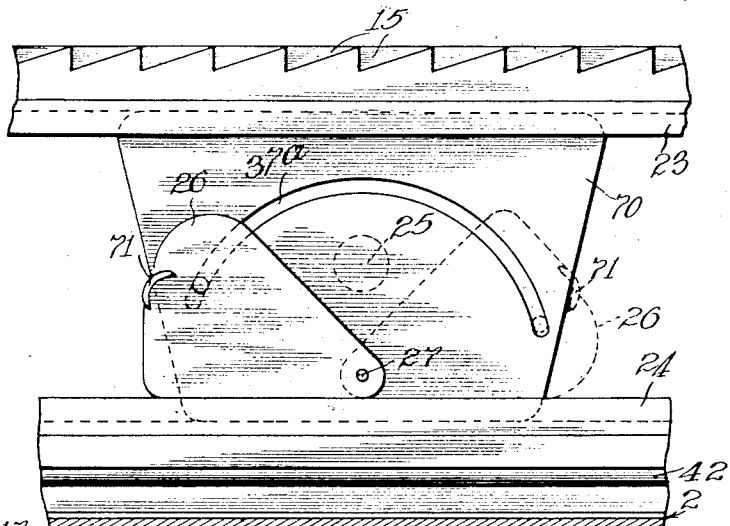
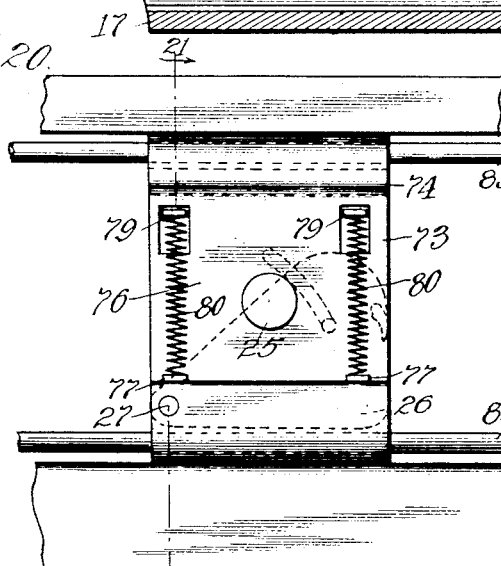
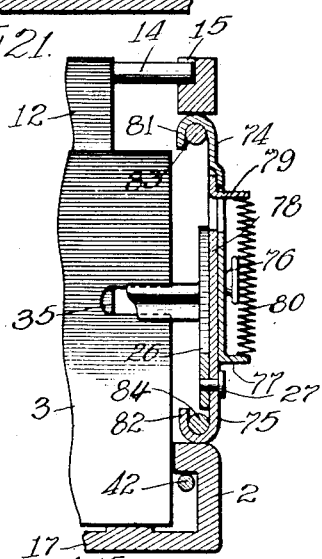
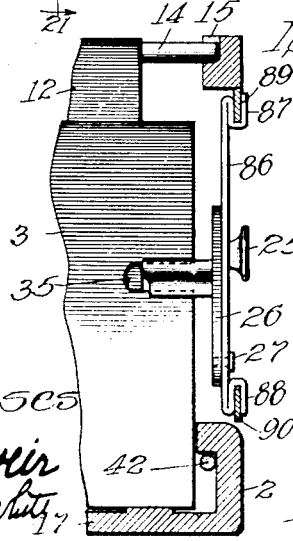
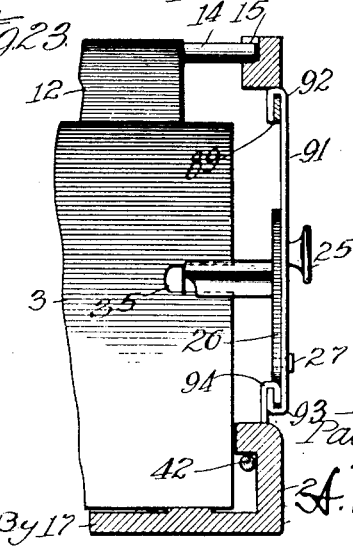

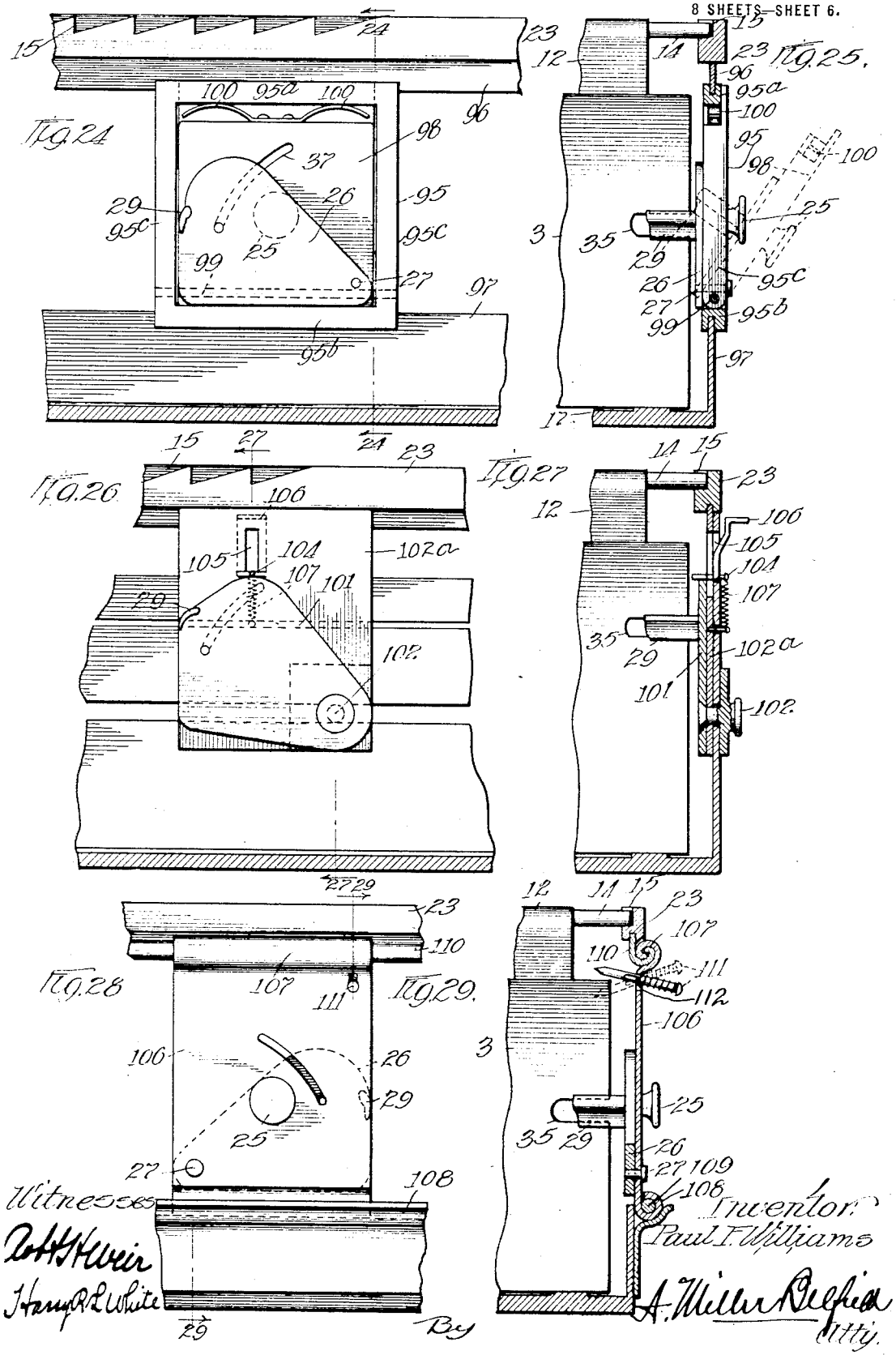

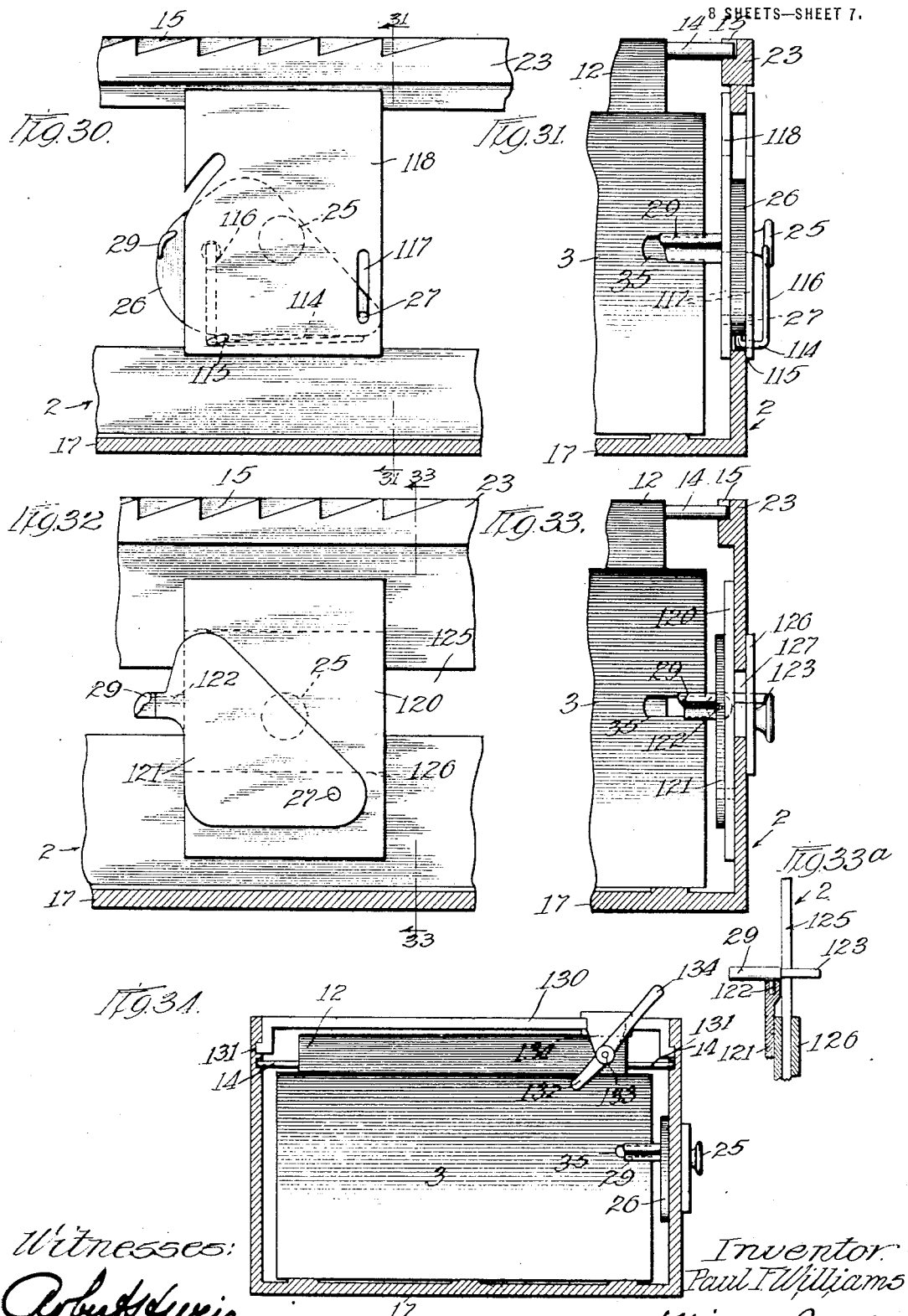

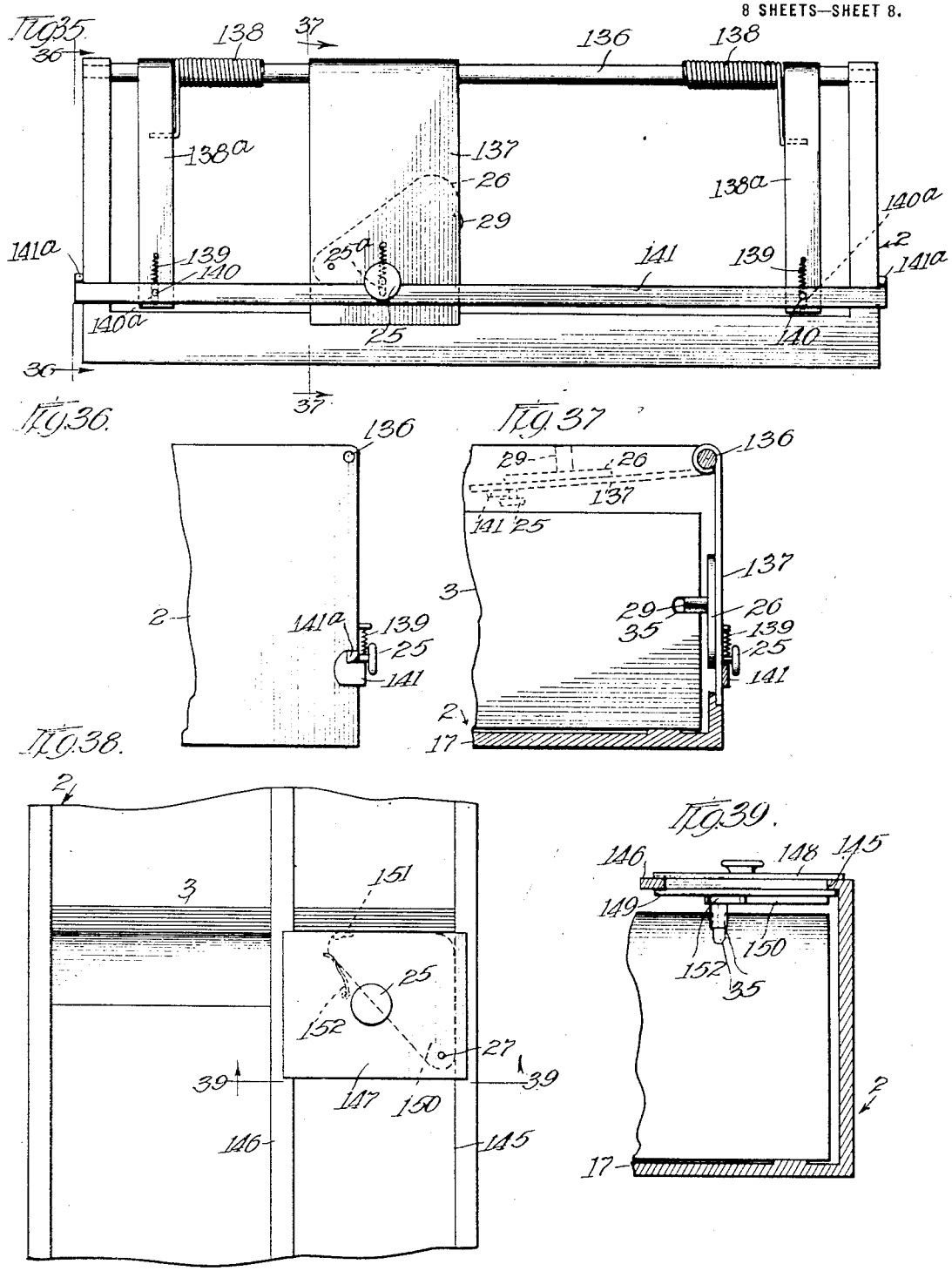

PAUL F. WILLIAMS, OF CHICAGO, ILLINOIS.

FILING-CABINET OR THE LIKE.

1,396,490.  Specification of Letters Patent.  Patented Nov. 8, 1921.

Application filed January 19, 1915. Serial No. 3,091.

*To all whom it may concern:*

Be it known that I, PAUL F. WILLIAMS, a citizen of the United States, residing at Chicago, in the county of Cook and State of Illinois, have invented a certain new and useful Improvement in Filing-Cabinets or the like, of which the following is a full, clear, concise, and exact description, reference being had to the accompanying drawings, forming a part of this specification.

My invention relates to devices or cabinets in which cards or other articles may be filed or arranged, such for example, as card index devices and the like.

Prominent objects of the invention are to provide a simple and advantageous device of the class specified; to arrange for the mechanical handling of the cards or other articles; to permit the cards or other articles to be mechanically moved one after another so as to expose each card or article in turn as desired; to arrange for the mechanical advancement and return of the cards or articles; to permit the cards or articles to be exposed and examined as long or as short a time as desired without interfering with the mechanical arrangements for exposing other cards or articles either in advance or in the rear of the same; to permit any desired card or cards in any particular place in the stack or collection of cards or devices to be examined without having to expose preceding or succeeding cards or articles; to provide simple, practical and effective mechanical devices for accomplishing the foregoing; and to secure the foregoing and other advantageous results in a simple and expeditious manner.

In the arrangement herein shown for carrying out my invention I show a device or cabinet commonly known as a card index or card index file, but it will be understood of course that the invention is capable of other applications and so I do not wish to be limited to such card index arrangement.

In such arrangement for carrying out the invention I show mechanical devices arranged in connection with the cabinet or file, by which the cards or other articles therein may be engaged and moved forwardly so that they may be exposed to permit them to be examined or read. Preferably one card or device is moved forwardly at a time so as to permit each card or device to be read or examined in its turn and then moved out of the way to permit the card or device next succeeding to be read or examined. This arrangement together with various features therein and modifications thereof will be explained more fully by reference to the accompanying drawings.

In these drawings Figure 1 shows a card index device embodying my invention in front elevation;

Fig. 2 is a vertical section taken on line 2—2 in Fig. 1;

Fig. 3 is a longitudinal section of the drawer portion of said device taken on line 3—3 in Fig. 2, said Fig. 3 being on an enlarged scale;

Figs. 4 and 5 are cross sections taken on lines 4—4 and 5—5 respectively in Fig. 6;

Fig. 6 is a central longitudinal section of the drawer portion of the device;

Figs. 7 and 8 are cross sections taken on lines 7—7 and 8—8 respectively in Fig. 6;

Figs. 9 and 10 are views of a part of the mechanism in the act of advancing and turning a card;

Fig. 11 is a vertical sectional view of a portion of a modified form of the device;

Fig. 12 is a cross section taken on line 12—12 in Fig. 11;

Fig. 13 is a view similar to Fig. 11 of another modification;

Fig. 14 is a cross section taken on line 14—14 in Fig. 13;

Figs. 15, 16, 17 and 18 are modified forms of a detail of construction called the engaging finger or device;

Fig. 19 is a longitudinal vertical section of another modification;

Fig. 20 is a similar view of a still further modification;

Fig. 21 is a cross section taken on line 21—21 in Fig. 20;

Figs. 22 and 23 are cross sectional views similar to Fig. 21 of still other modified forms;

Fig. 24 is a view similar to Fig. 20 of another modification;

Fig. 25 is a cross sectional view taken on line 25—25 in Fig. 24;

Fig. 26 is a view similar to Fig. 24 of another modification;

Fig. 27 is a cross section taken on line 27—27 in Fig. 26;

Fig. 28 is a view similar to Fig. 26 of another modification;

Fig. 29 is a cross section taken on line 29—29 in Fig. 28;

Fig. 30 is a longitudinal section of a portion of another modification;

Fig. 31 is a cross section taken on line 31—31 in Fig. 30;

Fig. 32 is a longitudinal section of a portion of another modification;

Fig. 33 is a cross section taken on line 33—33 in Fig. 32;

Fig. 33ᵃ is a plan view of a detail of construction;

Fig. 34 is a cross section of a further modification;

Fig. 35 is a longitudinal view similar to Fig. 3 if another modification;

Figs. 36 and 37 are cross sections taken on lines 36—36 and 37—37, respectively in Fig. 35;

Fig. 38 is a top plan view of a further modification;

Fig. 39 is a cross section taken on line 39—39 in Fig. 38;

Fig. 40 is a view of a card or similar device to be used in the modification shown in Figs. 38 and 39;

And Fig. 41 is a view of a card or device to be used in the other forms of the invention.

In Figs. 1 and 2 I show a card index device involving a base 1 in the form of a case which is adapted to contain a drawer 2 of suitable size and shape to hold a series of cards shown at 3 in Fig. 3. The drawer 2 is provided with knobs 4—4 by which it may be drawn out and pushed back into place.

As a matter of further improvement the base 1 is preferably provided with uprights 5—5 at the upper end of which is mounted a hood 6 which is adapted to contain an electric light 7, whereby the whole arrangement may be used as a combined desk or table light, and card index device. The drawer 2 is shown in Figs. 3 and 6 as provided with a series of cards 3 arranged crosswise of the length of the drawer and preferably provided with apertures 8 (Fig. 6), by which said cards may be slid along a rod 9 extended longitudinally of the drawer and having a head or knob 10 at one end which we shall call the front end of the drawer, and having its other end screw threaded as at 11, so as to be screwed into the threaded socket at the other or rear end of the drawer.

I also show a movable device 12 which forms an abutment at the back of the cards 3, said abutment conveniently being made of a piece of sheet metal provided at its upper edge with a rod 14 whose ends project as shown in Fig. 4, so as to engage teeth or notches 15—15 formed along the upper edges of the side walls of the drawer. The member 12 is conveniently provided with a spring end piece 16 adapted to rest upon the floor 17 of the drawer (Fig. 6), whereby said member 12 may be moved forwardly or backwardly and adjusted into any desired position in the drawer, said member 12 also being provided with an aperture 18 to receive the rod 9. The member 12 is preferably made so that it will have a certain amount of slant or inclination when in position in the drawer as shown in Fig. 6. The front of the drawer is provided with an end piece 19 preferably having a slant or inclination opposite to that of the member 12 and the rear of the drawer is provided with an end piece 20 preferably having a slant similar to that of the member 12. Thus the cards or other articles when in position in the drawer will rest upon the front end piece 19 and either the member 12 or the rear end piece 20, and so in either case the cards or articles at the front will slope forwardly and those nearer the rear will slope rearwardly as well shown in Fig. 6. Thus a separation is brought about in the series of cards, making a space or opening between the same, so that the cards may be exposed and read or examined, the ordinary practice being such that the front card of the rearmost portion of cards, that is the portion of cards resting either upon the member 12 or the back 20, will be exposed and may be read or examined.

In accordance with my invention I arrange so that the rear portion of cards may be mechanically engaged and moved forwardly so that the cards will be advanced from the rear portion of cards and added to the front portion of cards. This is preferably done card by card, each card being individually or singly moved forwardly and left at the rear of the forward portion of the cards, thereby exposing the next card in succession in the rear portion or set of cards. I show herein various arrangements for accomplishing this operation. Inasmuch as various other arrangements may be devised without departing from the spirit of the invention it will be understood that I do not wish to be limited to the particular mechanism or arrangements herein set forth.

Referring first to the arrangement shown in Figs. 1 to 10, inclusive, I show a carriage or movable member 22 arranged at one side of the drawer and mounted for movement longitudinally of the drawer in upper and lower guides 23 and 24. The carriage 22 is conveniently provided with a knob 25 by which it may be engaged by hand and moved forwardly and rearwardly as desired. A movable member or support 26 is mounted upon the carriage 22, and this member is so mounted as to allow it to have certain movements relatively to the carriage 22, which movements are permitted in this particular construction by pivotally mounting the member 26 to the carriage 22 by means of a pivot 27 at the lower corner of the member 26, said member 26 being shown in this particular arrangement as being somewhat heart shaped or triangular in form for purposes hereinafter to be mentioned. An engaging finger or device 29 is carried or supported by the member or support 26, said finger or device 29 projecting laterally from said member 26 inwardly into the interior of the drawer, as shown in Fig. 7, for example. The member 29 is intended to engage the card or other article in the drawer and to accomplish this engagement in a certain manner, and also to remain in engagement with the card or article while being moved so as to advance the card or article to the desired extent, and then disengage itself from the same so as to permit said card or article to remain or fall into a suitable forward position. The construction of the member 29 shown in Figs. 9 and 10 has its lower portion 30 formed as a blade or edge provided with an inclined or sloping rear face or surface 31 and a front substantially straight surface 32. The latter terminates at a shoulder or abutment 33 and the upper portion of the rear face is rounded or sloped forwardly at 34. This construction permits certain desirable results to be secured in the engagement and movement of the card or other device which will be seen in explaining more fully the operation of the mechanism in connection with a card or other article. In Fig. 41 I have shown a card 3 intended to be engaged and moved by a member 29, such card being preferably provided with a slot 35 at one side edge. This slot 35 is about the size of the member 29 so that said member may just about pass through said slot. In the operation of the arrangement the carriage 22 is pushed rearwardly in the drawer until the member 29 strikes against the front face of the card whereupon said member 29 will automatically slide upwardly along said front face of said card by reason of the inclination of the card and the slant of the surface 31 at the rear of the member 29 and the pivotal mounting of the member 26. This upward and rearward movement of the member 29 will continue until the lower edge of said member reaches the lower edge of the slot 35, whereupon said member 29 will fall or pass rearwardly through said slot 35 or rather into and partially through the same, and will thereupon drop downwardly into the position shown in Fig. 9, in which the lower portion of the member 29 has passed through said slot 35 and occupies a position in the rear of the portion of the card immediately below said slot. Further downward movement on the part of the member 29 is prevented by the abutment 33 which engages the upper edge or abutment formed by the portion of the card immediately below said slot. The carriage 22 is now advanced and the members 26 and 29 moved forwardly with it, thereby advancing also or at least tilting forwardly the card 3 engaged by the member 29. This continues until the card is tilted sufficiently to cause the member 29 to be elevated and forced out of the slot 35, which operation is about to take place in Fig. 10, the card falling forwardly in front of the member 29 and the latter slipping down to some extent and resting upon the rear face of said card, all of this rising and falling movement on the part of the member 29 being permitted by the pivotal mounting of the member 26 carrying said member 29. Thus a card is automatically and mechanically engaged by the device 29 and moved forwardly and deposited in a forward position, and the member 29 is automatically disengaged from said card in a position to engage and move another card. This operation is caused simply by the backward and forward movement of the carriage 22 by means of the knob 25 which may be engaged by the person operating the device. The engagement and disengagement of the card occurs automatically by the coöperation of the member 26 and its device 29 simply upon the forward and rear movement of the carriage 22. In order to accommodate and guide the movement of the member 26 an arc shaped slot 37 is formed in the plate 22ª forming the inner wall of the carriage 22, and a pin 38 is mounted on the member 26 and arranged to work in the slot 37, said pin being provided with a head 39 fitting against the inner surface of the plate 22ª.

The member 26 is preferably made in substantially the triangular or heart shaped form shown in order that its lower edge may rest upon the floor of the drawer without permitting the member 29 to drop unduly. Furthermore, the upper portion of said member is adapted to strike against the under side of the top guide 23 so that these two parts coöperate to form a stop arrangement to limit the upward movement of said member 26 and its finger 29. Thus the possible movement of the finger 29 is confined within the limits necessary for its proper action upon and with the cards.

As an arrangement for permitting the card feeding or moving mechanism to be applied at any point in the drawer, and to be adjusted to said location without interfering with the cards, I show in Figs. 1 to 10, inclusive, above referred to, an arrangement by which the carriage guides 23 and 24 may be swung outwardly as shown in Fig. 7, so that said carriage and the member 29 may be moved forwardly and backwardly throughout the length of the drawer, and adjusted to any desired position without having the member 29 strike or interfere with the side edges of the cards. As a convenient construction for permitting this swinging movement on the part of said guides 23 and 24, the same are secured together at their ends by end strips 40 and 41, so as to form a rigid rectangular frame and this frame is mounted upon a spindle 42 (Fig. 7) so as to form a pivotal mounting for the lower edge of the frame and permit the same to be swung as indicated in Fig. 7, carrying the carriage 22 with its coöperating parts bodily with it. This rectangular frame, however, is normally locked in vertical position against swinging movement, as shown in Fig. 4, by a link 43 pivoted at 44 to the upper portion of said frame, said link 43 being located adjacent the front end wall 2ª of the drawer, and being provided with a slot 45 accommodating a pin 46 secured to said front wall 2ª. The link 43 is provided with a notch in its lower edge and this notch is engaged by the prong 47 to a locking device or catch 48 pivotally mounted upon the spindle 42 and a spring 49 has an end portion 50 in contact with the lower edge of the locking device 48 so as to hold said device normally in elevated position with the prong 47 in engagement with the notch in the link 43, whereby said link is normally locked in the position shown in Fig. 4, in which position the frame carrying the carriage 22 is vertical. The spring 49 is secured by a rivet 51 to the floor of the drawer. A knob or handle 52 (Fig. 6) is arranged at the front end of the drawer and provided with a screw 53 which works in a slot 54 in the front of the drawer so as to permit said knob 52 to be raised and lowered and the head of the screw 53 to be elevated so as to permit the prong portion 47ª of the locking device 48 to be lowered by the head of said screw 53. Thus by depressing the knob 52 the screw 53 depresses the arm 47ª against the spring 50, and thereby removes the prong or shoulder 47 from the notch in the link 43 and so unlocks said link and permits the swinging frame carrying the carriage 42 to be tilted or swung outwardly as desired. At the rear end of the drawer the swinging carriage frame is also preferably locked, as by another link 43ª similar to the link 43, pivotally connected at 44ª to the rear of the swinging carriage frame, said link sliding upon a pin 46ª secured to the rear wall of the drawer. A locking catch 56 is also mounted upon the rod or spindle 42 and secured rigidly thereto, whereby when said spindle 42 is turned by depressing the screw 53 to unlock the front end of the swinging carriage frame, the catch 56 is also swung downwardly so as to cause its disengagement from the link 46ª and thereby unlock the rear of the carriage frame, at the same time the front end is being unlocked. Thus by manipulating the knob 52 the frame for the carriage 22 may be unlocked and swung outwardly either by engaging said frame directly or by means of the knob 25 controlling the carriage 22, and when so unlocked and swung outwardly the knob 25 may be moved so as to shift the carriage 22 forwardly or rearwardly to any desired place, escaping the edges of the cards in so doing, and when the desired place is reached, said carriage frame may be swung back to its vertical position and automatically locked by the action of the spring 50, whereupon the card feeding mechanism may be operated as desired to feed or advance cards from the new position to which said mechanism has been adjusted.

In Figs. 4 and 5 especially I show a cover 58 which is preferably made of transparent material such as glass, mica, or the like inclosed in a frame 59 of substantially the size of the top of the drawer. This frame by fitting snugly upon the drawer permits the cards to be seen but prevents their being touched or handled. This is advantageous for sanitary reasons and also to prevent the cards being removed from the drawer and taken by persons to whom they do not belong. These features are very desirable in certain places, as for example in public institutions where card indexes and the like are employed.

In the arrangement shown in Figs. 11 and 12 the carriage 22ᵇ is arranged to slide in longitudinally extending guides 23 and 24, as in the arrangement previously described. The card engaging member 29, however, instead of being mounted upon a pivoted support or member, is in this arrangement mounted upon a small supplemental carriage 60 which is arranged to slide in an inclined slot or guideway 61, formed in the carriage 22ᵇ. By this arrangement the carriage 22ᵇ may be manipulated back and forth by a knob 25 as before and the member 29 will slide up the front face of a card until it enters the slot 35 therein, as shown in Fig. 12, whereupon said member 29 will drop into said slot and thereupon a forward movement of the carriage 22ᵇ will cause the advance motion or tilting of the card so as to feed it forward after which the member 29 will slip through the slot and come into position ready for another operation in the rear of the card as in the previous arrangement.

In the modification shown in Figs. 13 and 14 a carriage 63 is shown provided with the pivoted supporting member 26 carrying the finger 29 as in the first mentioned arrangement. But this carriage 63 has a special and advantageous construction. It is made of two separate plates 64 and 65 each of which is provided with laterally projecting prongs or projections 66 and 67, respectively, and between these prongs are arranged springs 68—68 tending to separate the prongs and thereby the plates 64 and 65 from one another. The member 26 is pivoted to the lower plate 65. Thus the carriage is in effect separable or collapsible to permit it to be easily collapsed and removed from its position in the guides 23 and 24, if desired.

In Figs. 15, 16, 17 and 18 I show several different forms of card engaging finger members. In Fig. 15 I show the member 29ᵃ having its rear face 31ᵃ more straight than the member 29 described in connection with the first mentioned construction. The rear and upper face 34ᵃ is also more straight and inclined than the face 34 of said member 29. The portion forming the abutment 32ᵃ is also more angular. In Fig. 16 the member 29ᵇ is more in the form of an arc of a circle, the various surfaces being less distinctly marked and merging one into the other. In Fig. 17 the member 29ᶜ is more in the form of two rectangularly disposed portions 29' and 29''. In Fig. 18 the member 29ᵈ is composed of two nearly flat parts arranged at a very obtuse angle to one another.

Referring to the modification shown in Fig. 19, this construction involves a carriage 70 which may be slid in the guideways 23 and 24 previously described in connection with the first mentioned construction. The carriage 70 however, is longer than the carriage 22 of the first mentioned construction, and is provided with an arc shaped slot 37ᵃ much longer than the slot 37 of said other construction, whereby said pivoted member 26 may be swung nearly 180 degrees so as to substantially reverse its position as shown by dotted lines in Fig. 19. The member 26 carries a card engaging finger 71 substantially like the member 29ᵇ of Fig. 16, but having both ends pointed so that either end may slide up a card face and then drop into a card slot. Thus by placing the member 26 in different positions, as shown by the solid and dotted lines in Fig. 19, a reversible arrangement may be secured, whereby the manipulation of the carriage 70 by the knob 25 with the member 26 in one position may be caused to feed cards forwardly and the manipulation of said carriage with the member 26 in the other position may feed cards in the other direction or rearwardly.

The structure shown in Figs. 20 and 21 is somewhat similar to the arrangement shown in Figs. 13 and 14, involving a special type of sliding carriage. The carriage shown indicated at 73 is composed of two separate members 74 and 75 whereof the member 74 is provided with a long downwardly extending part 76 terminating in outwardly extending prongs or projections 77, and the member 75 is provided with an upwardly extending portion 78 provided with outwardly extending prongs or projections 79. Springs 80 are interposed between the prongs 77 and 79, and tend to separate said prongs from one another, and thereby hold said plates forming said carriage in proper position. Thus by pushing or adjusting the prongs 77 and 79 toward one another the plates may be separated to collapse and remove the carriage. As a preferred arrangement the plates 74 and 75 have their ends bent as at 81 and 82 respectively, so as to form hook members to engage rods 83 and 84 respectively, which form the guideways upon which said carriage slides. The ends of these rods 83 and 84 are connected together and mounted to swing upon the rod 42 as previously described in connection with the first mentioned construction, so that the separation of the plates 74 and 75 to permit the removal of the carriage formed thereby may take place when said rods are swung outwardly.

The construction shown in Fig. 22 involves a still further type of carriage 86, formed of a single plate having its upper and lower edges bent double as at 87 and 88, respectively, so as to engage longitudinally extending guide rods 89 and 90.

The construction shown in Fig. 23 also has a new type of carriage 91, formed of a plate having its upper and lower edges bent in goose neck fashion, as shown at 92 and 83 to form hook portions to engage the guide strips 89 and 94, respectively.

In the construction shown in Figs. 24 and 25 I show a carriage 95 arranged to slide lengthwise of suitable guide members 96 and 97, said carriage being in the form of a hollow frame comprising top and bottom members 95ᵃ and 95ᵇ, and side members 95ᶜ, as shown in Fig. 24. Within this hollow sliding frame 95 is arranged a supporting member 98 which is pivoted at its lower end to the lower portion of the frame 95 by means of a rod or spindle 99, whereby said member 98 may be swung outwardly to the position shown in dotted lines in Fig. 25. The member 98 carries the pivoted member 26 described in connection with the first mentioned construction, or a corresponding or equivalent member, said member 26 being provided with a card engaging and moving device such as the member 29. The arc shaped slot 37 is formed in the member 98. The latter is provided with means for temporarily engaging or locking itself to the frame 95, as for example the spring clips 100. Thus the carriage 95 may be manipulated backwardly and forwardly to cause the feeding or advancement of the cards, and when desired to change the position of the feeding arrangement the member 98 may be swung outwardly to the dotted position shown in Fig. 25, so that the member 29 will be free from the edge of the cards and then the carriage 95 may be shifted forwardly or rearwardly to the desired position and then swung back to its vertical position and operated to feed the cards as before.

In the arrangement shown in Figs. 26 and 27 provision is made for permitting the card engaging device or finger to be swung up over the top of the cards when desired so as to allow said finger with its coöperating mechanism to be shifted backwardly or forwardly to any desired position to feed or advance other cards. In the arrangement shown a pivoted member 101 similar to the pivoted member 26 of the first described construction is mounted upon a pivot 102 mounted on a carriage 102ᵃ which is arranged to slide in a slot 103 in the side wall of the drawer, said member 101 being provided with a card engaging device such as the member 29. A stop 104 is arranged above the member 101 whereby the upward movement of said member will ordinarily be limited. Said stop 104 is vertically adjustable however, being arranged to slide in a vertical slot 105 in the carriage 102ᵃ and having a finger piece 106 outside of the drawer whereby it may be engaged and lifted, a spring 107 normally holding said stop 104 in its downward position. Thus by elevating the stop 104 by the finger piece 106 the member 101 may be lifted so as to raise the member 29 above the tops of the cards and thereby permit the member 101 with said member 29 to be shifted forwardly or rearwardly to any desired place in the series of cards.

In the construction shown in Figs. 28 and 29, a sliding carriage 106 is conveniently made of a single plate of metal having its upper end curved or curled, as shown at 107 (Fig. 29), and its lower end also curved as at 108 to form a bearing for clasping a guide-rod 109. The upper portion 110 of the drawer is curved to engage the curved portion 107 on the carriage 106, whereby a simple and effective construction of carriage is provided. A pin 111 is provided and arranged to be inserted at any desired place in the cards so as to separate or divide the cards as desired. This pin is conveniently carried upon an arm 112 formed at one side of the carriage 106.

In the arrangement shown in Figs. 30 and 31 another arrangement for elevating the card engaging finger or device is shown. In this arrangement the pivoted member 26 carrying the device 29 is supported above a rod 114 which has a bent end 115, (Fig. 31), below said member 26. Said rod 114 has an upwardly extending arm 116 which may be grasped by the hand. The pivot 27 for the member 26 is arranged to slide in a slot 117 in the carriage 118. Thus when the arm 116 is grasped and elevated the member 26 will be bodily lifted, the pivot 27 sliding upwardly in the slot 117. Thus the member 29 will be raised sufficiently to permit it to be moved over the tops of the cards so as to allow the card feeding mechanism to be adjusted to any place in the series of cards by shifting the carriage 118.

The arrangement shown in Figs. 32, 33 and 33ᵃ involves a still further arrangement for moving the card engaging finger or device out of position to engage the cards so as to allow adjustment of the feeding mechanism without interfering with the cards. The structure of these fingers involves a sliding carriages 120 carrying a pivoted member 121 provided with a card engaging device such as the member 29. This latter is pivotally connected with the member 121 as by being mounted upon a pivot or spindle 122 whereby said member 29 may be swung upwardly. Said member 29 is preferably provided with a small extension or finger piece 123, which may be engaged and depressed so as to tilt said member 29 upwardly. By said arrangement the member 29 may be tilted out of the way of the cards and then the carriage 120 shifted to any desired position at which it is desired to feed or advance the cards. This mechanism, it will be seen, is very simple and advantageous. The knob 25 by which the carriage 120 may be shifted, is arranged to move in a slot 125 in the side of the drawer, said slot also serving as a guideway for the carriage 120, the outer side plate 126 having a portion 127 fitting into said slot.

In Fig. 34 I show a device which may be used to separate the cards into different parts or portions, said device comprising a bridge 130 adapted to be mounted upon the top of the drawer and to be capable of movement longitudinally of the drawer as for example by providing said bridge with projections or feet 131 adapted to work in slots formed in the side walls of the drawer. This bridge 130 carries a lever 132 pivoted at 133 to a hanger 134 carried by the bridge 130. One end of the lever 132 is adapted to be interposed between cards and the other end 134 is adapted to be engaged by the fingers so as to adjust the lever into or out of position between the cards.

In the arrangement shown in Fig. 35 provision is made for swinging the card feeding mechanism upwardly and over to the top of the drawer so as to permit it to occupy space really within the drawer itself and not to project from the side of the drawer. In the arrangement shown a rod 136 is extended longitudinally the length of the drawer and a carriage 137 carrying the card feeding mechanism is mounted for sliding movement upon said rod 136. The moving mechanism in its lowered position to feed the cards is shown in full lines in Figs. 35 and 37, and the same is shown swung up and to the side and thence down into the drawer itself in dotted lines in Fig. 37. The moving mechanism may be swung up into this elevated or dotted position in order to adjust it to different places to feed different cards or when it is desired to push the drawer into the case to put it out of use, the case being of the ordinary size to take the drawer without anything projecting from its side. Springs 138—138 are arranged upon the rod 136 and tend to hold the card feeding mechanism in its elevated position. A longitudinally extending rod 141 engages the lower end of the carriage 137 and also the lower ends of plates 138$^a$ mounted on rod 136 and engaged by springs 138, and holds the moving mechanism in its lowered position. The bar or rod 141 is bodily depressible, however, pins 140 passing through said bar and working in slots 140$^a$ in the plates 138$^a$. The ends of the bar 141$^a$ are normally engaged by lugs or clips 141$^a$ on the ends of the drawer. Springs 139 tend to hold said bar in engagement with said lugs. The knob 25 is made depressible by a slot in the carriage 137, so that by depressing said knob the bar 141 may be depressed to allow it to be disengaged from the lugs 141$^a$, to permit the moving mechanism to be swung up.

In Figs. 38 and 39 I show the card feeding mechanism mounted above the cards and arranged to operate by engaging slots in the tops of the cards, a card 3$^a$ with such a top slot 35$^a$ being shown in Fig. 40. In this arrangement the top edge 145 of the drawer may be employed as one guideway for the sliding carriage and a rod 146 may be extended longitudinally of the drawer for the other guideway. A carriage 147 is shown arranged to slide along these guideways 145 and 146, said carriage comprising two members 148 and 149 engaging said guideways, one above and the other below the same. A movable member such as the pivoted member 150 is mounted upon the lower plate 149 and a card engaging device 151 is carried by the member 150. A spring 152 is arranged to act against one edge of the member 150 to cause proper action of the same. Thus a forward and back movement of the carriage 147 by the knob 25 will cause the member 151 to engage the slots in the tops of the cards and thereby feed the same forwardly. By this arrangement there is no projection on the side of the drawer and the mechanism is much simplified.

Referring to Fig. 41, I have shown in dotted lines two slots 35′ and 35″ above and below the slot 35. These slots 35′ and 35″ are understood to be in other cards, and as a preferred arrangement these other cards are arranged on opposite sides of the card 3 containing the slot 35, the card containing the slot 35″ being in front and the one containing the slot 35′ being in the rear of the card having the slot 35. In this way the turning of one card at a time is insured, the engaging finger passing through one of said slots but not being able to pass through the slot in the card next in the rear of it because the slot in said rear card fails to register with the one receiving the engaging finger. Thus by placing the slots in different vertical positions in adjacent cards engagment with only one card at a time is insured. If desired to turn more than one card at a time, the cards could be arranged accordingly, as for example by putting slots in two adjacent cards directly in register with one another, whereby the engaging finger would pass through both slots and engage the back of the second card.

It will be understood that changes and modifications may be made without departing from the spirit of the invention.

What I claim as my invention is:

1. The combination with a holder or container for a series of cards or other articles, of means for moving said articles one by one sidewise from one position to another within said holder or container.

2. The combination with a container for a series of articles of means adjustable across the edges of said articles for engaging one of said articles and moving same sidewise from one position to another within said container.

3. The combination with a container for a series of thin articles, of means for engaging an edge portion of one of said articles, said means being mounted for movement in said container across the edges of the articles whereby said articles may be engaged and moved one by one from one position to another.

4. The combination of a container for a series of thin articles, of means for moving said articles comprising a device adapted to engage edge portions of said articles, and means for mounting said device so as to permit it to be moved bodily toward and away from said articles, and also to be moved for adjustment to engage edge portions thereof.

5. The combination of a container for a series of thin articles, of means for moving said articles comprising an engaging device for engaging edge portions of said articles, a carriage movable in said container toward and away from said articles, and means for mounting said engaging device upon said carriage so as to cause said engaging device to move bodily with said carriage, and at the same time to have an independent movement for adjustment to engage said edges of said articles.

6. Means for moving a series of thin articles comprising an engaging device having a thin edge adapted to engage edge portions of the articles, a pivoted member carrying said engaging device, and a slidable carriage on which said member is pivotally mounted.

7. Moving means of the class specified comprising an engaging finger adapted to engage the edge of a single card, a support on which said finger is mounted, and a slidable carriage on which said support is pivotally mounted, said support being arranged to swing back and forth across the edges of the cards and move them sidewise when engaged by said finger.

8. Moving means of the class specified comprising an engaging finger, a support on which said finger is mounted, and a slidable carriage on which said support is pivotally mounted, said support being of general triangular form pivoted at one corner and having the engaging finger mounted between the ends of the side opposite said pivoted corner.

9. The combination of a container, and means for moving articles therein mounted upon one side wall of said container, said side wall being provided with a movable portion which can be moved outwardly to permit said mechanism to be shifted without interfering with the contents of the container.

10. The combination of a container having one of its side walls provided with a swinging frame forming a longitudinal guideway, moving mechanism comprising a carriage mounted upon said guideway and arranged for movement longitudinally thereof, and an engaging device carried by said carriage and projecting into the interior of said container.

11. The combination of a container having one of its side walls provided with a swinging frame forming a longitudinal guideway, moving mechanism comprising a carriage mounted upon said guideway and arranged for movement longitudinally thereof, an engaging device carried by said carriage and projecting into the interior of said container, and means for locking said swinging frame in vertical position.

12. The combination of a container having one of its side walls provided with a swinging frame forming a longitudinal guideway, moving mechanism comprising a carriage mounted upon said guideway and arranged for movement longitudinally thereof, an engaging device carried by said carriage and projecting into the interior of said container, and means for locking said swinging frame in vertical position, said means comprising a slotted link pivotally connected with said swinging frame, a pin in the slot of said link, and a spring controlled catch for engaging said link when the same is in its innermost position.

13. The combination of a container having one of its side walls provided with a swinging frame forming a longitudinal guideway, moving mechanism comprising a carriage mounted upon said guideway and arranged for movement longitudinally thereof, an engaging device carried by said carriage and projecting into the interior of said container, means for locking said swinging frame in vertical position, said means comprising a slotted link pivotally connected with said swinging frame, a pin in the slot of said link, and a spring controlled catch for engaging said link when the same is in its innermost position, and a slidable knob adapted to actuate said catch and cause its disengagement from said link.

14. The combination of a container having one of its side walls provided with a swinging frame forming a longitudinal guideway, moving mechanism comprising a carriage mounted upon said guideway and arranged for movement longitudinally thereof, an engaging device carried by said carriage and projecting into the interior of said container, means for locking said swinging frame in vertical position, said means comprising a slotted link pivotally connected with said swinging frame, a pin in the slot of said link, and a spring controlled catch for engaging said link when the same is in its innermost position, a slidable knob adapted to actuate said catch and cause its disengagement from said link, in combination with a rock shaft or rod on which said catch is mounted, and a second catch also mounted upon said rock shaft, and a second slotted link pivotally connected with said frame at another point and having means for engaging said second catch, whereby said frame may be locked in two places and unlocked by the operation of said knob.

15. The combination of a container having a side wall provided with a swinging frame carrying moving mechanism, means for locking the opposite ends of said frame, and a single device for unlocking both of said locking means.

16. An engaging device comprising a blade portion and an abutment extending along the edge thereof opposite the engaging edge of the blade, and means for mounting said engaging device so that it may swing bodily in a direction transversely to its length.

17. An engaging device comprising a blade portion having one side curved and an abutment on the other side and means for pivotally mounting said device.

18. An engaging device comprising a blade portion and a swinging member carrying said blade portion and arranged to swing the same bodily in a direction transverse to the length of said blade portion.

19. An engaging device comprising a pivoted member and a blade mounted at the peripheral edge of said pivoted member, the length of said blade extending in a direction substantially parallel with the axis of the pivotal support of said member, whereby said blade will be swung bodily transversely to its length and at a distance removed from the pivotal mounting of said member.

20. A swinging member carrying an engaging device, said swinging member being substantially triangular in form and pivoted at one corner and having said engaging device located between the corners opposite said pivoted corner.

21. The combination of a container and a spring controlled pin mounted upon a side wall of said container and adapted to project into the interior thereof.

22. The combination with a container of moving mechanism comprising an engaging device for engaging a thin article and shifting it crosswise of its surface, and means whereby said moving mechanism may be shifted so as to withdraw said engaging device from operative position.

23. The combination of a container, moving mechanism comprising an engaging device for engaging a thin article, and means whereby said engaging device may be moved laterally to the direction of movement of the contents of said container so as to permit movement of said engaging device without engaging said contents.

24. The combination of a container having one side wall provided with longitudinally extending guides and moving mechanism comprising a carriage mounted upon said guides and carrying an engaging device mounted for movement independently of said carriage.

25. The combination of a container, a series of thin articles therein, said articles being slotted at one side and adjacent articles having said slots located at different heights, said side edges of said articles being otherwise unslotted, in combination with means for passing through any one of said slots to engage said articles.

26. The combination of a container, a series of thin articles therein, said articles being slotted at one side and adjacent articles having said slots located at different heights, there being three articles adjacent to one another with slots of different heights, said side edges of said articles being otherwise unslotted, in combination with means for passing through any one of said slots to engage said articles.

27. Articles of the kind specified having edges provided with similar slots which are situated at different points in said edges in different articles, said side edges of said articles being otherwise unslotted, in combination with means for passing through any one of said slots to engage said articles.

28. Articles of the kind specified having their side edges provided with similar slots, said slots being of different height in different articles, said side edges of said articles being otherwise unslotted, in combination with means for passing through any one of said slots to engage said articles.

29. Articles of the kind specified having their side edges provided with similar slots, said slots being of different height in different articles, and there being slots at three different heights in said articles, said side edges of said articles being otherwise unslotted, in combination with means for passing through any one of said slots to engage said articles.

30. The combination with a container of a single device for moving articles therein one by one and a cover closing said container.

In witness whereof, I hereunto subscribe my name this 15th day of January, A. D. 1915.

PAUL F. WILLIAMS.

Witnesses:
 A. LYDA JONES,
 HAZEL A. JONES.